United States Patent
Ramasamy

(10) Patent No.: US 10,289,531 B2
(45) Date of Patent: *May 14, 2019

(54) SOFTWARE INTEGRATION TESTING WITH UNSTRUCTURED DATABASE

(71) Applicant: ACCENTURE GLOBAL SOLUTIONS LIMITED, Dublin (IE)

(72) Inventor: Premkumar Ramasamy, Charlotte, NC (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,510

(22) Filed: Feb. 20, 2018

(65) Prior Publication Data
US 2018/0173615 A1 Jun. 21, 2018

Related U.S. Application Data

(63) Continuation of application No. 15/160,449, filed on May 20, 2016, now Pat. No. 9,934,130.

(51) Int. Cl.
G06F 11/36 (2006.01)
G06F 16/13 (2019.01)
G06F 16/33 (2019.01)

(52) U.S. Cl.
CPC .......... *G06F 11/3668* (2013.01); *G06F 16/13* (2019.01); *G06F 16/3331* (2019.01)

(58) Field of Classification Search
CPC .............. G06F 11/3688; G06F 11/3692; G06F 17/30675
See application file for complete search history.

(56) References Cited

U.S. PATENT DOCUMENTS 5,615,333 A 3/1997 Juettner et al.
6,138,112 A 10/2000 Slutz et al.
(Continued)

OTHER PUBLICATIONS

"DbUnit—Getting Started" [retreived from the Internet Oct. 10, 2017], 8 pages. <URL: https://web.archive.org/web/20160406123613/ http://dbunit.sourceforge.net/howto.html> published Apr. 6, 2016 as per Wayback Machine.
(Continued)

*Primary Examiner* — Wei Y Zhen
*Assistant Examiner* — Amir Soltanzadeh
(74) *Attorney, Agent, or Firm* — Mannava & Kang, P.C.

(57) ABSTRACT

According to examples, software integration testing with an unstructured database may include determining a driver class file for an integration testing tool to connect to a specified unstructured database. A connectivity driver may be generated for the specified unstructured database. Dependency files may be determined for retrieval of data from the specified unstructured database and update of the data in the specified unstructured database. The driver class file, the connectivity driver, and the dependency files may be stored in a library of the integration testing tool. A connection may be established between the integration testing tool and the specified unstructured database. A query may be sent to the specified unstructured database for execution, and query results may be received based on performing a function when the query is executed. The query results may be compared to validation data to determine whether the function operates in a determined manner.

20 Claims, 15 Drawing Sheets

(56) References Cited

U.S. PATENT DOCUMENTS

| | | |
|---|---|---|
| 6,219,829 B1 | 4/2001 | Sivakumar et al. |
| 2003/0037037 A1 | 2/2003 | Adams et al. |
| 2004/0186826 A1 | 9/2004 | Choi et al. |
| 2005/0108211 A1 | 5/2005 | Karimisetty et al. |
| 2005/0204201 A1 | 9/2005 | Meenakshisundaram et al. |
| 2008/0005159 A1 | 1/2008 | Kang et al. |
| 2015/0212920 A1 | 7/2015 | Kraus et al. |

OTHER PUBLICATIONS

"DbUnit—Running DbUnit Integration Tests", [retreived from the Internet Oct. 10, 2017], 4 pages. <URL: https://web.archive.org/web/20160511131909/http://dbunit.sourceforge.net/integrationtests.html> published May 11, 2016 as per Wayback Machine.

"DB Testing", [retreived from the Internet Oct. 10, 2017], 6 pages. <URL: https://web.archive.org/web/20160329005504/http://www.dallaway.com/acad/dbunit.html> published Mar. 29, 2016 as per Wayback Machine.

"Effective Unit Testing with DbUnit", [retreived from the Internet Oct. 10, 2017], 6 pages. <URL: https://web.archive.org/web/20160402070916/http://www.onjava.com:80/pub/a/onjava/2004/01/21/dbunit.html> published Apr. 2, 2016 as per Wayback Machine.

"JUnit", [retreived from the Internet Oct. 10, 2017], 3 pages. <URL: https://web.archive.org/web/20160413213920/https://en.wikipedia.org/wiki/JUnit> published Apr. 13, 2016 as per Wayback Machine.

T_Libraries\DB1\DB1-jdbc-1.2.5-Copy.zip\Org\apache\DB1\cql\jdbc ← 302

| Name | Type | Compressed size | | Pass |
|---|---|---|---|---|
| AbstractConnection.class | CLASS File | 2 KB | No | |
| AbstractResultSet.class | CLASS File | 3 KB | No | |
| AbstractStatement.class | CLASS File | 2 KB | No | |
| DB1Connection.class | CLASS File | 7 KB | No | |
| DB1DatabaseMetaData.class | CLASS File | 6 KB | No | |
| DB1DataSource.class | CLASS File | 3 KB | No | |
| DB1Driver.class | CLASS File | 2KB | No | |
| DB1PreparedStatement$1.class | CLASS File | 1KB | No | |
| DB1PreparedStatement.class | CLASS File | 6 KB | No | |
| DB1ResultSet$CResultSetMeta... | CLASS File | 2 KB | No | |
| DB1ResultSet.class | CLASS File | 11 KB | No | |
| DB1ResultSetExtras.class | CLASS File | 1 KB | No | |
| DB1RowId.class | CLASS File | 1 KB | No | |
| DB1Statement$1.class | CLASS File | 1 KB | No | |
| DB1Statement.class | CLASS File | 5 KB | No | |
| DB1StatementExtras.class | CLASS File | 1 KB | No | |
| CloumnDecoder$1.class | CLASS File | 1 KB | No | |
| ColumnDecoder$CFamMeta.class | CLASS File | 2 KB | No | |
| ColumnDecoder.class | CLASS File | 2 KB | No | |

Dependency File

- AbstractJdbcType.class
- AbstractJdbcUUID.class
- JdbcAscii.class
- JdbcBoolean.class
- JdbcBytes.class
- JdbcCounterColumn.class
- JdbcDate$1.class
- JdbcDate.class ← 400
- JdbcDecimal.class ← 402
- JdbcDouble.class
- JdbcFloat.class
- JdbcInetAddress.class
- JdbcInt32.class
- JdbcInteger.class
- JdbcLexicalUUID.class
- JdbcLong.class
- JdbcTimeUUID.class
- JdbcUTF8.class
- JdbcUUID.class
- MarshalException.class
- TypesMap.class

FIG. 4

| Error Received | Jar File added in RIT Library Manager to resolve |
|---|---|
| The following error occurred in connecting to the database:java.lang.NoClassDefFoundError: org.apache. DB1 .cql.jdbc.AbstractJdbcType | DB1 -clientutil-1.2.6.jar |
| The following error occurred in connecting to the database:java.lang.NoClassDefFoundError: org.apache. DB1 .thrift.ConsistencyLevel | DB1 -thrift-1.2.6.jar |
| The following error occurred in connecting to the database:java.lang.NoClassDefFoundError: org.apache.thrift.TEnum | libthrift-0.7.0.jar |
| The following error occurred in connecting to the database:java.lang.NoClassDefFoundError: org.apache. DB1 .cql.jdbc. DB1 Driver (initialization failure) | log4j-1.2.17.jar ; slf4j-log4j12-1.7.6.jar ; slf4j-api-1.7.5.jar |

SOFTWARE INTEGRATION TESTING WITH UNSTRUCTURED DATABASE

PRIORITY

This application is a Continuation of commonly assigned and co-pending U.S. patent application Ser. No. 15/160,449, filed May 20, 2016, the disclosure of which is hereby incorporated by reference in its entirety.

BACKGROUND

Integration testing may be performed to ensure that a software application operates correctly. Difficulties may arise when performing integration testing because of incompatibilities between an integration tester that is used to test an application and a component, such as a database, that is used by the integration tester to test the application. For example, the integration tester may be incompatible with the database, and cannot execute queries on the database to retrieve data needed to test the application. As a result, uncertainty may exist as to whether an application will operate correctly when deployed in a production setting.

BRIEF DESCRIPTION OF DRAWINGS

Features of the present disclosure are illustrated by way of examples shown in the following figures. In the following figures, like numerals indicate like elements, in which:

FIGS. 3A and 3B respectively illustrate a driver class file available in a driver Jar file, and details of a driver class file, according to an example of the present disclosure;

FIG. 4 illustrates a dependency file, according to an example of the present disclosure;

FIG. 6 illustrates different error messages received in the integration testing tool while testing the connection between the integration testing tool and the unstructured database, and the Jar files added in an integration testing tool library to resolve errors, according to an example of the present disclosure;

DETAILED DESCRIPTION

Figure 1A:
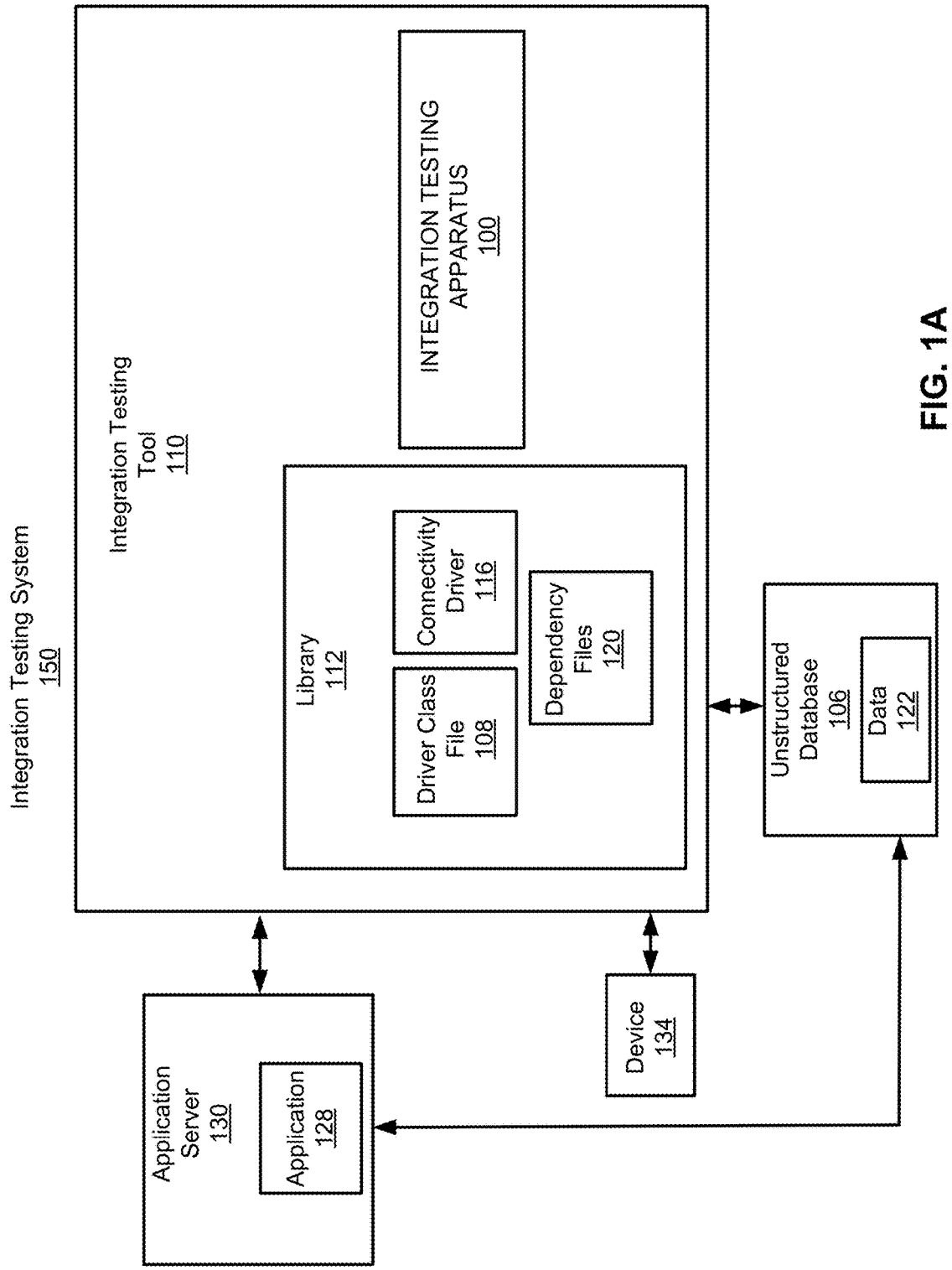
FIG. 1A illustrates a high level organization of an integrating testing system including an integration testing apparatus (ITA), according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details.

Throughout the present disclosure, the terms "a" and "an" are intended to denote at least one of a particular element. As used herein, the term "includes" means includes but not limited to, the term "including" means including but not limited to. The term "based on" means based at least in part on.

Many existing integration testing tools are designed to test applications that utilize structured databases, and often are not compatible with unstructured databases. For example, many integration testing tools do not have the capability to interface with unstructured databases and perform data operations, such as storing and retrieving data, on unstructured databases. As a result, many existing integration testing tools may not be able to test applications that use unstructured databases. According to examples of the present disclosure, an integration testing apparatus (ITA) solves this problem by making it possible for an integration testing tool to test applications that interact with unstructured databases. The ITA establishes a connection between the integration testing tool and the unstructured database to make it possible for testing the application, and thus minimizes incompatibilities that may otherwise occur between the integration testing tool and the unstructured database during application testing. For a Java™-based integration testing tool, the ITA disclosed herein may be designated as a Java database connectivity (JDBC) integration testing apparatus (ITA).

An unstructured database, for example, includes data that is not stored according to a predefined data model or schema. In contrast, a structured database requires prior knowledge of an information schema to maintain a structure within the database. For example, in a structured database, data is commonly stored in rows and columns according to a schema that specifies the data to be included in each field. A field may be described as a storage location referenced by a row and column identifier. An unstructured database may store data that does not necessarily conform to a specified model. For example, the unstructured database may include textual unstructured data that includes data that does not conform to the specified model. Textual unstructured data may be generated in media like email messages, digital presentations, digital documents, instant messages, etc. Unstructured data may further include non-textual data, such as images, video, audio, etc. Unstructured databases are commercially available and are desirable for use in situations where increased security is desired with respect to a structured database, where the overall size of data stored in the database is not known or can grow without determined bounds (e.g., in "big data" like applications), etc. An example of a commercially available unstructured database is the Cassandra™ database. An unstructured database may store structured data, which has fields, as well as unstructured data.

An integration testing tool, for example, performs testing of a software application, also referred to as an application. The integration testing tool may test modules of the application individually, or after the modules are combined. For example, different modules of the application may perform different operations, and integration testing may test whether the modules operate in a determined manner individually, or when combined. The modules may be independently tested prior to being combined, and then, the modules may be combined and tested for integration testing. Integration testing tools are commercially available. An example of a commercially available integration testing tool is the IBM Rational Integration Tester™, which may be used to test applications as part of web service automation testing.

The unstructured database may store data for the application being tested. For example, the unstructured database may be a backend database storing data used by the application. The integration testing tool may test whether functions operate in a determined manner. Functions may include operations performed by one or more modules of the application. When the integration testing tool tests functions performed by the application, the application may store data in the unstructured database. To determine whether the application functions operate in a determined manner, the integration testing tool may need to retrieve the data from the unstructured database. The data from the unstructured database is compared by the ITA to validation data, which may be determined from server logs or is otherwise determined or provided to the ITA. If the results retrieved from the unstructured database match the validation data, then the application functions may be determined to be operating in a specified manner by the ITA.

As mentioned above, the ITA connects the integration testing tool to the unstructured database. For example, the ITA makes it possible for the integration testing tool to connect, store, query and perform other database operations on the unstructured database for integration testing of the application. Without the ITA, the integration testing tool may be unable to communicate with the unstructured database, and may be unable to retrieve application data from the unstructured database to validate the functions and operations performed by the application. For example, Structured Query Language (SQL) is commonly used by applications to store and retrieve data from a structured database. However, SQL relies on the schema of the structured database, including the fields, for storage and retrieval of the data. The unstructured database may not use a schema, and thus, conventional SQL queries may not be used to retrieve data from the unstructured database. The ITA makes it possible for the integration testing tool to retrieve data and perform other database operations on the unstructured database as is further discussed below.

As disclosed herein, the elements of the ITA may be embodied as machine readable instructions stored on a non-transitory computer readable medium. In addition, or alternatively, the elements of the ITA may be hardware or a combination of machine readable instructions and hardware.

FIG. 1A illustrates a high level organization of an integrating testing system 150 including an ITA 100, according to an example of the present disclosure.

An integration testing tool 110 may perform integration testing of an application 128. The integration testing tool 110 may include the ITA 100 and a library 112.

The ITA 100 may operate as a database connector that may interact with an unstructured database 106, where the unstructured database 106 is used for integration testing of the application 128. The ITA may further operate as the unstructured database driver to retrieve data 122 from the underlying unstructured database 106. The ITA 100 may forward a query (e.g., where the query is related to a function performed by an application 128 that uses the unstructured database 106) to the unstructured database 106, and perform retrieval, manipulation, removal, and/or other operations on the data 122 in the unstructured database 106.

In order for the integration testing tool 110 to connect to the unstructured database 106, the library 112 of the integration testing tool 110 may be configured with the relevant components of the ITA 100. For the example of a Java-based integration testing tool and a Java-based unstructured database, the library 112 of the integration testing tool 110 may be configured with the relevant components of the JDBC ITA. The library 112 of the integration testing tool 110 may include a plurality of files per unstructured database or a single file per unstructured database. For the example of a Java-based integration testing tool and a Java-based unstructured database, the plurality of files may include Java archive (Jar) files.

In order to implement the ITA 100 for a particular unstructured database, a driver class file 108 for the unstructured database 106 may be determined. The driver class file 108 may be described as a file that includes routines to connect to the unstructured database 106. The driver class file 108 may be configured in the integration testing tool library 112. The driver class file 108 may enable the connection of the integration testing tool 110 with the unstructured database 106. The routines for the driver class file 108 may be used to validate credentials of the unstructured database 106. Examples of credentials may include the unstructured database name, etc. The credentials may be validated by the driver class file 108 as parameters. The routines of the driver class file 108 may be used to evaluate the parameters for any syntax errors. Based on the validation of the parameters, the driver class file 108 may be used to establish the connection between the integration testing tool 110 and the unstructured database 106.

The ITA 100 may further include a connectivity driver 116 for enabling the connection of the integration testing tool 110 with the unstructured database 106. The connectivity driver 116 may include a path to a location where the driver class file 108 resides. The path may be used by the integration testing tool 110 to access the driver class file 108.

Further, for the ITA 100, dependency files 120 may be determined. The dependency files 120 may make it possible for retrieval of data 122 from the unstructured database 106 and update of data 122 in the unstructured database 106. Thus for the example of a Java-based integration testing tool 110 and a Java-based unstructured database 106, the library 112 of the integration testing tool 110 may be configured with the relevant dependency files 120, which makes it possible for the integration testing tool 110 to connect to retrieve data 122 from the unstructured database 106 and update data 122 in the unstructured database 106.

The ITA 100 may validate the result of the function performed by the application 128. For example, the ITA 100 may validate the result of the function performed by the application 128 by comparing validation data from an application server 130 with data 122 from the unstructured database 106.

Further, the ITA 100 may control operation of a device 134 based on the validation of the result of the function performed by the application 128. The device 134 may include any type of device including a processor capable of executing machine-readable instructions to perform one or more operations.

The ITA 100 disclosed herein provides technical solutions to technical problems related, for example, to implementing communication between an integration testing tool and an unstructured database. The ITA 100 disclosed herein also provides technical solutions to technical problems related, for example, to operation control of a device.

Figure 1B:
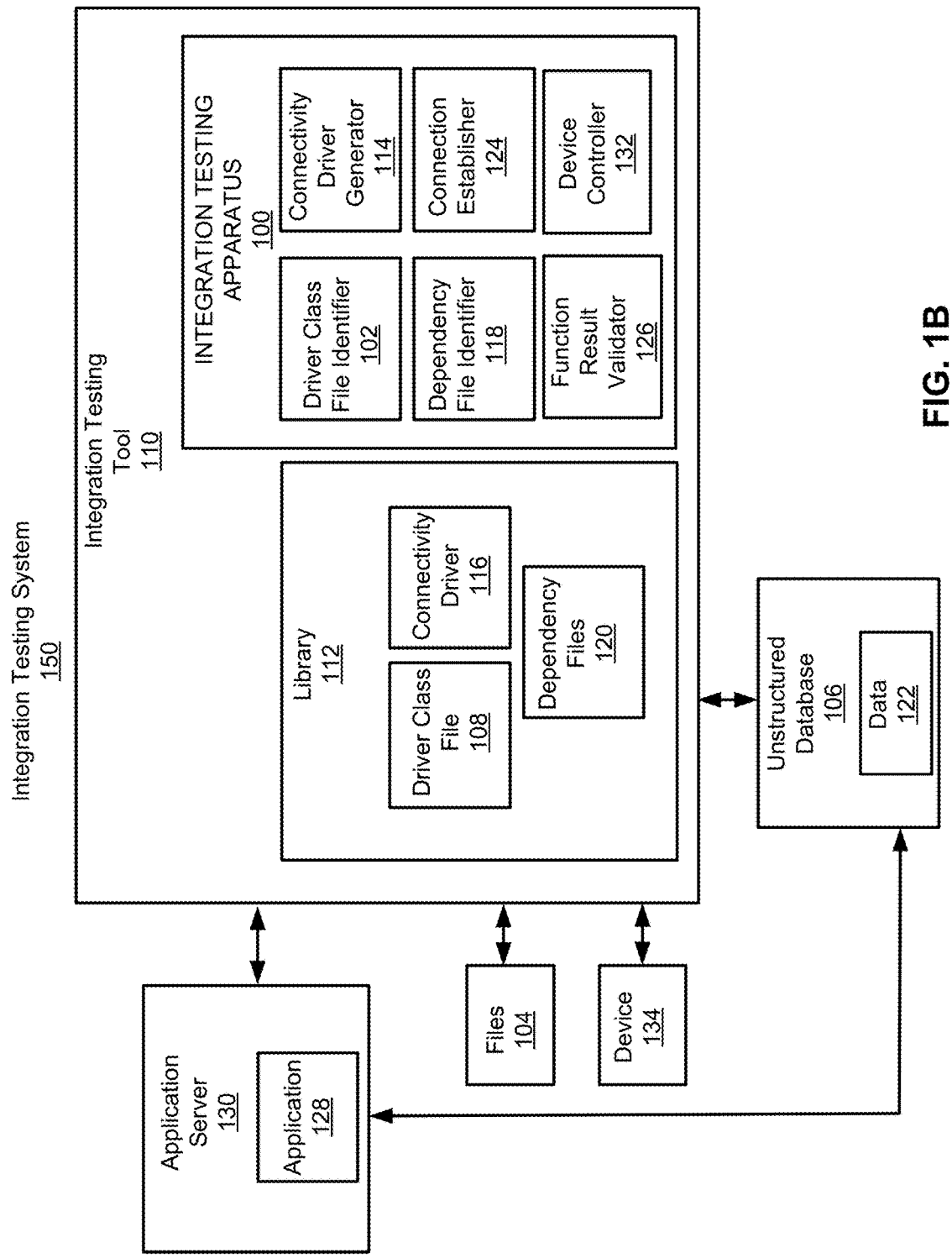
FIG. 1B illustrates further details of the ITA of the integrating testing system of FIG. 1A, according to an example of the present disclosure.

FIG. 1B illustrates further details of the ITA 100 of the integrating testing system 150, according to an example of the present disclosure. The ITA 100 may include a driver class file identifier 102 to retrieve and analyze files 104 associated with a plurality of unstructured databases, including a specified unstructured database (hereinafter referred to as the "unstructured database 106"). The files 104 may be stored in a data repository that is accessed by the ITA 100. The files 104 may include various files associated with a plurality of unstructured databases. The files 104 may be retrieved from one or more data sources associated with the plurality of unstructured databases. The driver class file identifier 102 may retrieve the files 104 from data sources or conduct searches on the Internet to retrieve the files 104, and store the files 104 in the data repository. In an example, the files 104 may include Jar files that include driver class files, dependency files, etc., that facilitate connecting to the plurality of unstructured databases and/or performing other operations associated with the plurality of unstructured databases.

The driver class file identifier 102 may determine the driver class file 108 for an integration testing tool 110 to connect to the unstructured database 106. For example, the driver class file identifier 102 may identify the driver class file 108 from the files 104 stored in a data repository by searching the data repository for files associated with the unstructured database 106. The driver class file 108 that is determined for the unstructured database 106 may be stored in a library 112 of the integration testing tool 110.

Once the driver class file 108 is determined, a connectivity driver generator 114 may generate the connectivity driver 116. The connectivity driver 116 may include a path to a location of the driver class file 108 in the library 112. In an example, the path may include a location identifier in a file system, such as file name, pointer, link, folder identifier or directory name, etc.

A dependency file identifier 118 may determine the dependency files 120 that make it possible for the retrieval of data 122 from the unstructured database 106. Further, the dependency files 120 may make it possible to update the data 122 in the unstructured database 106.

A connection establisher 124 may invoke the driver class file 108 and the connectivity driver 116 to establish a connection between the integration testing tool 110 and the unstructured database 106. Further, the connection establisher 124 may invoke the dependency files 120 for the retrieval of the data 122 from the unstructured database 106, and the update of the data 122 in the unstructured database 106.

A function result validator 126 may validate a result of a function performed by the application 128. The function may include an operation performed by the application 128 that is being tested by the integration testing tool 110 for the integration testing of the application 128.

The application server 130 may host and execute the application 128.

A device controller 132 may control operation of a device 134 in response to a determination that the result of the function performed by the application 128 is valid.

The driver class file identifier 102 may retrieve and analyze the files 104 associated with a plurality of unstructured databases, including the unstructured database 106. Based on the analysis, the driver class file identifier 102 may determine the driver class file 108 for the integration testing tool 110 to connect to the unstructured database 106. For the example of a Java-based integration testing tool and a Java-based unstructured database, the files 104 may include Jar files. From the files 104, the driver class file identifier 102 may determine a driver file for the unstructured database 106. For the example of a Java-based integration testing tool and a Java-based unstructured database, the driver file may include a driver Jar file. For the example of the Cassandra database, the driver file that includes the driver class file 108 for the unstructured database 106 may include the "cassandra-jdbc-1.2.5.jar" file.

In Java, a Jar file may include a package file format used to aggregate a plurality of Java class files and associated metadata and resources (e.g., text, images, etc.) into one file to distribute application software or libraries on a Java platform. The Jar files may include all of the applicable Java class files which enable the connection of the integration testing tool 110 with the unstructured database 106. The Java class files may be generally designated as the applicable driver class files for the JDBC ITA.

The determined driver class file 108 for the unstructured database 106 may be stored in the library 112 of the integration testing tool 110. Once the driver class file 108 for the unstructured database 106 is stored in the library 112, the integration testing tool 110 may be executed. The driver class file 108 is further discussed with respect to FIGS. 2-3B.

Figure 2:
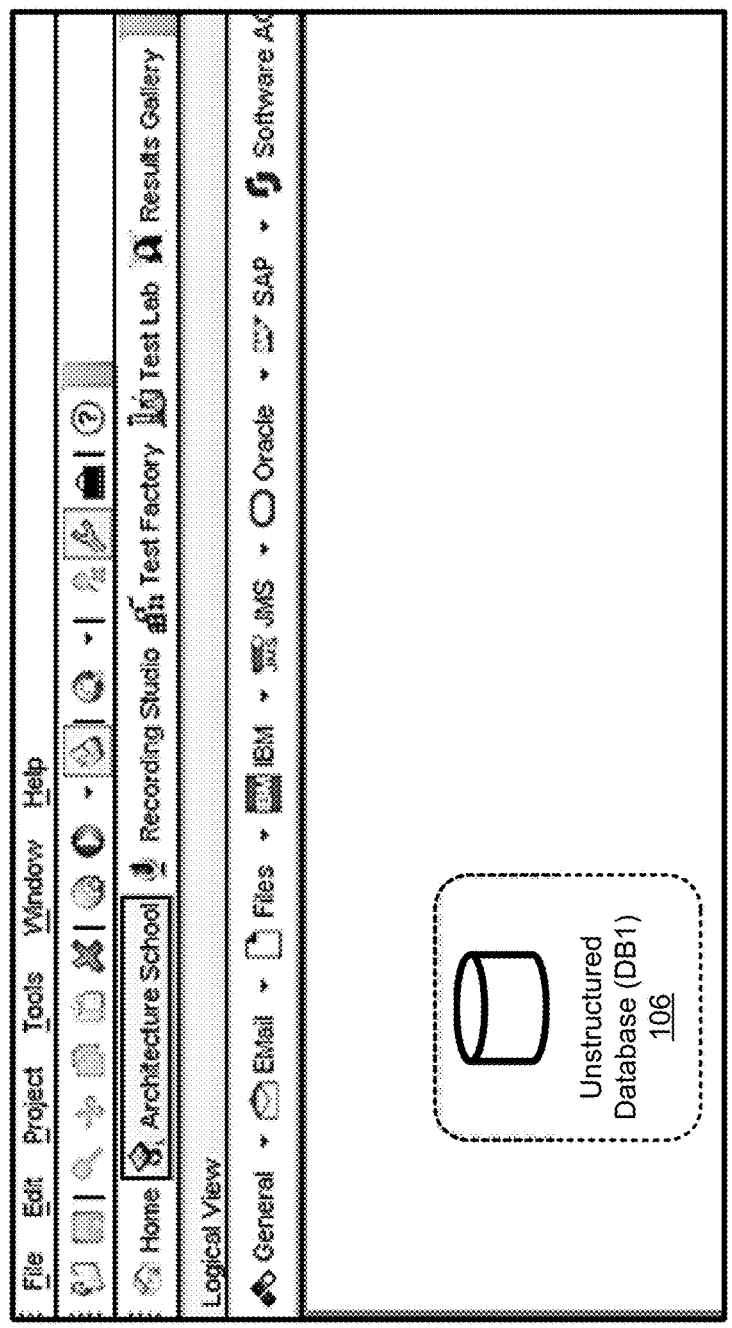
FIG. 2 illustrates a graphical user interface (GUI) that may be generated by an integration testing tool, according to an example of the present disclosure.

FIG. 2 illustrates a graphical user interface (GUI) that may be generated by the integration testing tool 110, according to an example of the present disclosure. A representation of the unstructured database 106 may be dragged and dropped into the GUI of the integration testing tool 110. In doing so, the ITA 100 may execute the driver class file identifier 102 to determine the driver class file 108, and perform other operations to establish a connection between the integration testing tool 110 and the unstructured database 106 as disclosed herein. By dropping the unstructured database 106 into the GUI of the integration testing tool 110, the unstructured database 106 is specified as the database that is to be used by the integration testing tool 110. In the description of FIGS. 3A-10, the unstructured database may be referred to as DB1, such as shown in FIG. 2.

FIG. 3A illustrates a driver class file available in a driver Jar file for DB1, according to an example of the present disclosure. From the various class files at 300, the driver class file of the unstructured database DB1 is highlighted. The driver class file 108 may be denoted "DB1Driver.class". The driver Jar file illustrated in FIG. 3A may be stored along with other driver Jar files with the files 104. The driver class file identifier 102 may search the files 104 to locate the driver Jar file that may be used to connect the integration testing tool 110 to the unstructured database 106. The driver class file identifier 102 may open the located driver Jar file, and identify the driver class file 108. According to an example, the driver Jar file may be located based on a search of driver Jar files for unstructured databases, and particularly, based a search of driver Jar files that include "DB1". If a driver Jar file including "DB1" is not located, then driver Jar files including the term "driver" may be identified as potential Jar files that include the driver class file 108 for the unstructured database 106.

The dependency files 120 for DB1 may be located based on a search of the files 104 that address dependency errors, which is further discussed below with respect to FIG. 5. A word-based search may be performed on the files 104 to match dependency error terms with names and/or metadata associated with the files 104. With respect to dependency files that are located to address dependency errors, the dependency files may also be identified based on an Internet search to add to dependency files present in the files 104. Prior to error analysis, an initial set of the dependency files 120 may be located based on a search of a set of previously determined dependency files to identify potential dependency files that may be used with the unstructured database 106.

Figure 3B:
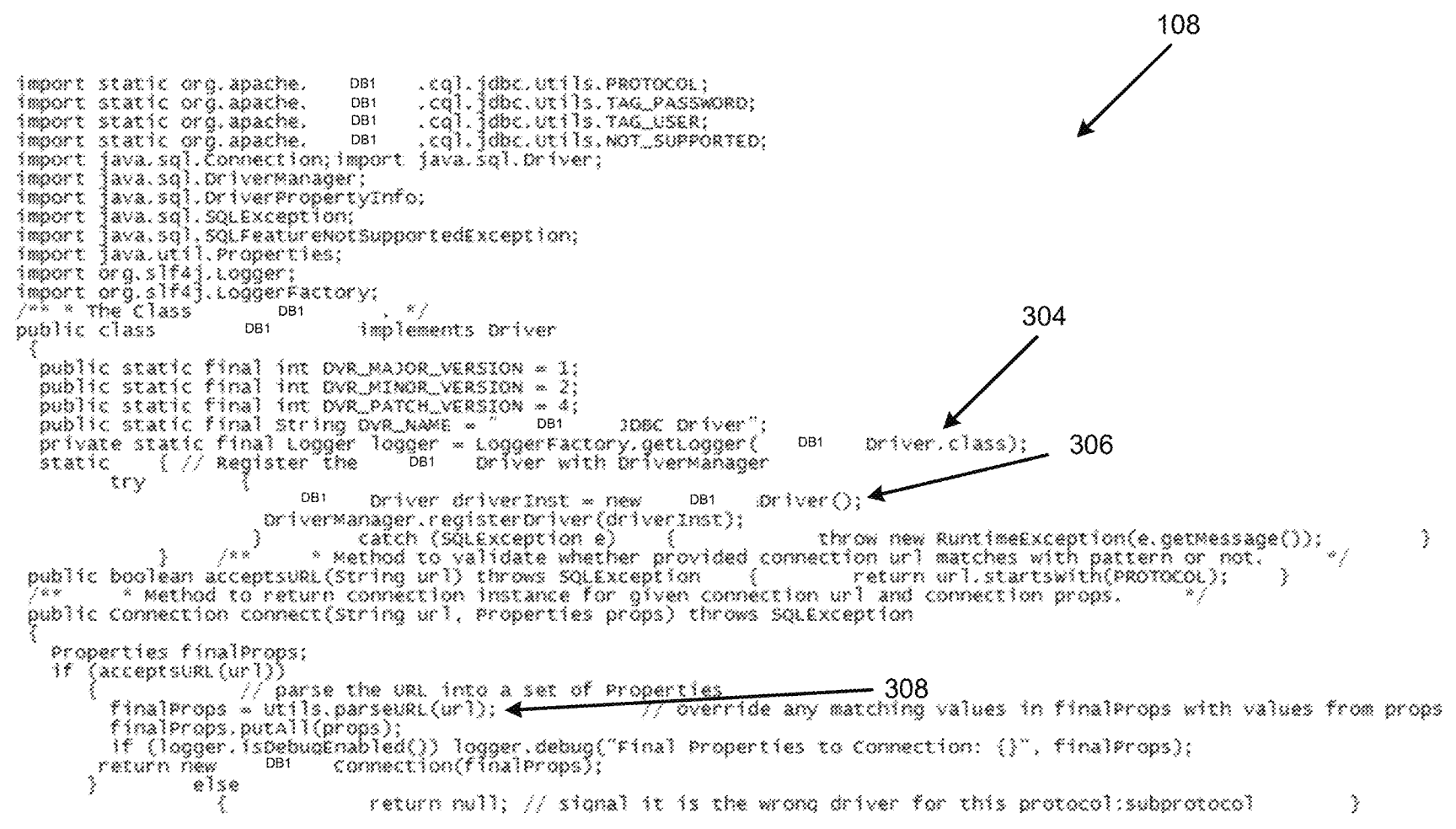

FIG. 3B illustrates an example of content of the driver class file 108 (e.g., DB1Driver.java), which may include Java code as shown. At 304, parameters for the unstructured database 106 may be validated upon execution of the driver class file 108 (i.e., logger=LoggerFactory.getLogger (DB1Driver.class)). At 306, DB1Driver( ) may represent a class, and driverinst may represent an object. The driverinst object may be used to call functions available in the DB1Driver( ) class for connecting the integration testing tool 110 to the unstructured database 106. At 308, the complete URL of the unstructured database 106 may be parsed as a parameter that is validated upon execution of the driver class file 108 (i.e., finalProps=Utils.parseURL(url)).

Referring again to FIG. 1B, once the driver class file 108 is determined, the connectivity driver generator 114 may generate the connectivity driver 116. For the example of a Java-based integration testing tool and a Java-based unstructured database, the connectivity driver generator 114 may generate a JDBC connectivity driver. The connectivity driver 116 may include a folder path of the location of the driver class file 108 (e.g., DB1Driver.class for the example of FIG. 3A) in the Jar file. Accordingly, for the Jar file location indicated at 302, the connectivity driver 116 for connecting the integration testing tool 110 to the unstructured database 106 is: org.apache.DB1.cql.jdbc.DB1Driver.

Referring again to FIG. 1B, the dependency file identifier 118 may determine the dependency files 120 which make it possible for the retrieval of the data 122 from the unstructured database 106. Further, the dependency files 120 may make it possible for the update of the data 122 in the unstructured database 106. For the example of a Java-based integration testing tool and a Java-based unstructured database, the dependency file identifier 118 may determine dependency Jar files. The dependency Jar files may include different class files that perform retrieval or update of different data types. The data types may include date data types, character data types, numerical data types, etc. For example, FIG. 4 illustrates a dependency Jar file for use in manipulating different data types. Examples of class files for data types that include date data types, decimal data types, etc., are identified, respectively, at 400 and 402.

Figure 5:
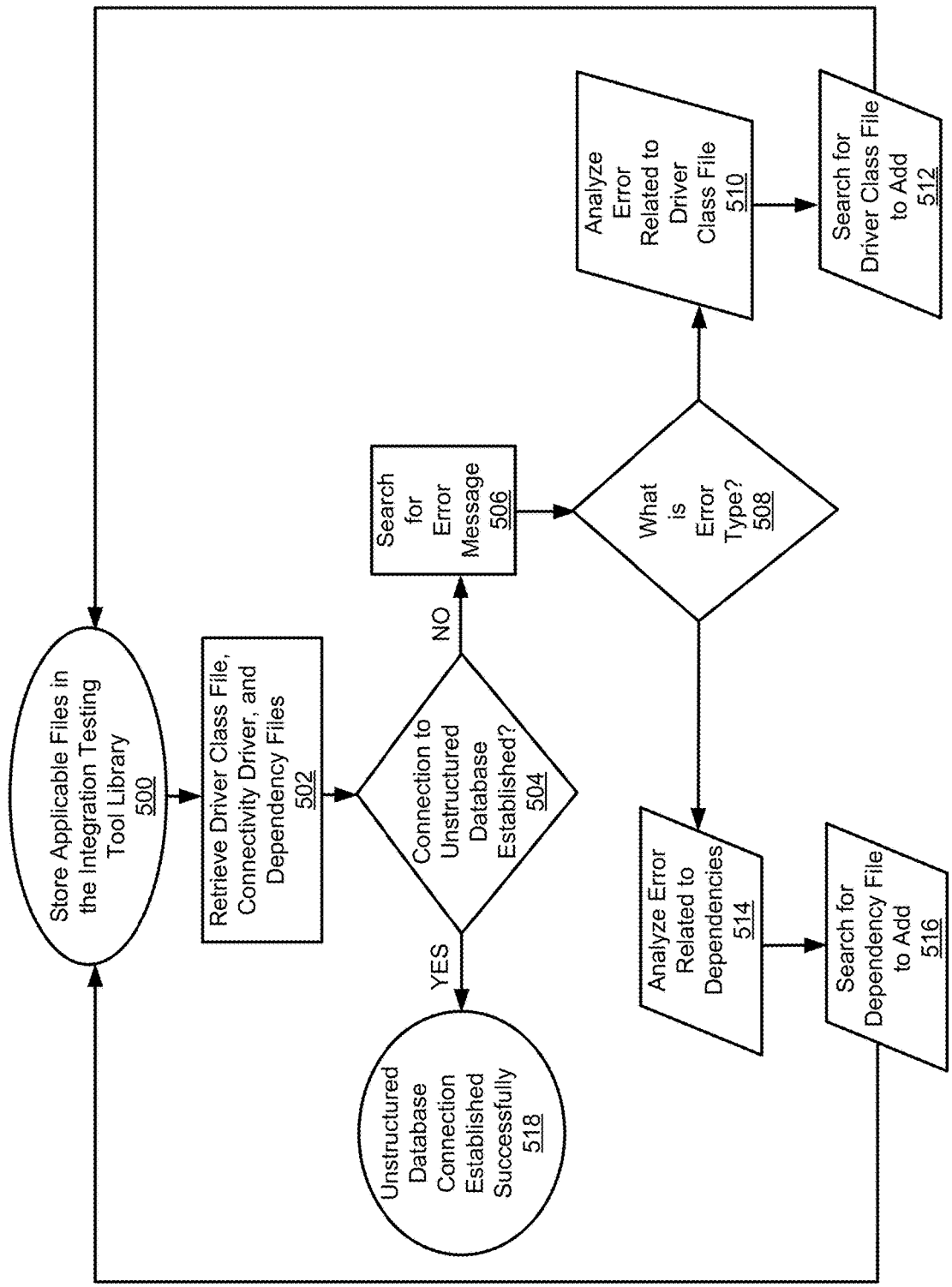
FIG. 5 illustrates a flowchart illustrating a technique for obtaining dependency files and for establishing a connection between the integration testing tool and the unstructured database, according to an example of the present disclosure.

FIG. 5 illustrates a flowchart illustrating a technique for obtaining dependency files and for establishing a connection between the integration testing tool 110 and the unstructured database 106.

FIG. 5 is described by way of example with respect to the components shown in FIG. 1B. Referring to FIG. 5, at block 500, the applicable files may be stored in the integration testing tool library 112. The applicable files may include the files needed to establish the connection between the integration testing tool 110 and the unstructured database 106. For the example of a Java-based integration testing tool and a Java-based unstructured database, the applicable files may include the applicable Jar files. For example, the applicable files may include the driver class file 108, the connectivity driver 116, and the dependency files 120.

At block 502, the connection establisher 124 may retrieve the applicable files. For example, the connection establisher 124 may retrieve the driver class file 108, the connectivity driver 116, and the dependency files 120.

At block 504, the connection establisher 124 may test whether the ITA 100 can connect to the unstructured database 106 using the applicable files. For example, the connection establisher 124 may test whether the ITA 100 can connect to the unstructured database 106 using the driver class file 108, the connectivity driver 116, and the dependency files 120.

In response to determining that the connection between the integration testing tool 110 and the unstructured database 106 is unsuccessful at block 504, at block 506, the connection establisher 124 may search for an error message. The error message may be generated by the integration testing tool 110 when the ITA 100 cannot connect to the unstructured database 106. The connection establisher 124 may search for the error message in an integration testing tool 110 error log.

At block 508, the connection establisher 124 may determine an error type. For example, the connection establisher 124 may determine whether the error type is a driver class file related error or a dependency error. The driver class file related error may be designated as a driver class file incorrectly determined error. In this regard, incorrectly determined means that the ITA 100 cannot connect to the unstructured database 106 using the driver class file 108 that has been previously determined. The dependency error may be designated as a driver class file correctly determined and dependency error. In this regard, correctly determined means that the ITA 100 can connect to the unstructured database 106 using the driver class file 108 that has been determined.

At block 510, the connection establisher 124 may analyze the driver class file related error determined at block 508.

At block 512, the connection establisher 124 may search for a further driver class file to add, with the added driver class file being stored in the library 112 at block 500. The further driver class file may be stored in the library 112 to address the error message analyzed at block 510. The search for the further driver class file may be performed using the files 104. For example, the connection establisher 124 may invoke the driver class file identifier 102 to identify a further driver class file 108 from the files 104 stored in a data repository by searching the data repository for files associated with the unstructured database 106. The previously stored driver class file may be removed from the library 112 upon storage of the further driver class in the library 112.

In response to determining that the connection between the integration testing tool 110 and the unstructured database 106 is unsuccessful at block 504, and the driver class file 108 is correctly determined, at block 514, the connection establisher 124 may analyze the dependency error determined at block 508.

At block 516, the connection establisher 124 may search for a further dependency file to add, with the added dependency file being stored in the library 112 at block 500. The further dependency file may be added to address the error related to dependencies analyzed at block 514. The search for the further dependency file may be performed in the files 104.

The analysis at blocks 500-516 may be performed iteratively until there are no further driver class file related errors, and no further dependency errors, in which case at block 518, the connection establisher 124 may establish a successful connection between the integration testing tool 110 and the unstructured database 106.

FIG. 6 illustrates different error messages that may be received in the integration testing tool 110 while testing a connection between the integration testing tool 110 and the unstructured database 106 (e.g., see blocks 506 and 508 of FIG. 5). Further, FIG. 6 illustrates the Jar files added in the integration testing tool library 112 to resolve errors, according to an example of the present disclosure. Referring to FIG. 6, the errors received are shown in the left column and the Jar files added in the integration testing tool library 112 to resolve the errors are shown in the right column. For example, if an error includes an initialization failure error at 600, a corresponding Jar file at 602 may be added in the integration testing tool library 112 to resolve the error. The corresponding Jar file at 602 may be identified based on a search of the files 104, and/or based on an Internet search for Jar files that address a particular type of error. In this regard, a word-based search may be performed to identify the Jar files based on content of the Jar files and/or metadata associated with the Jar files.

Figure 7:
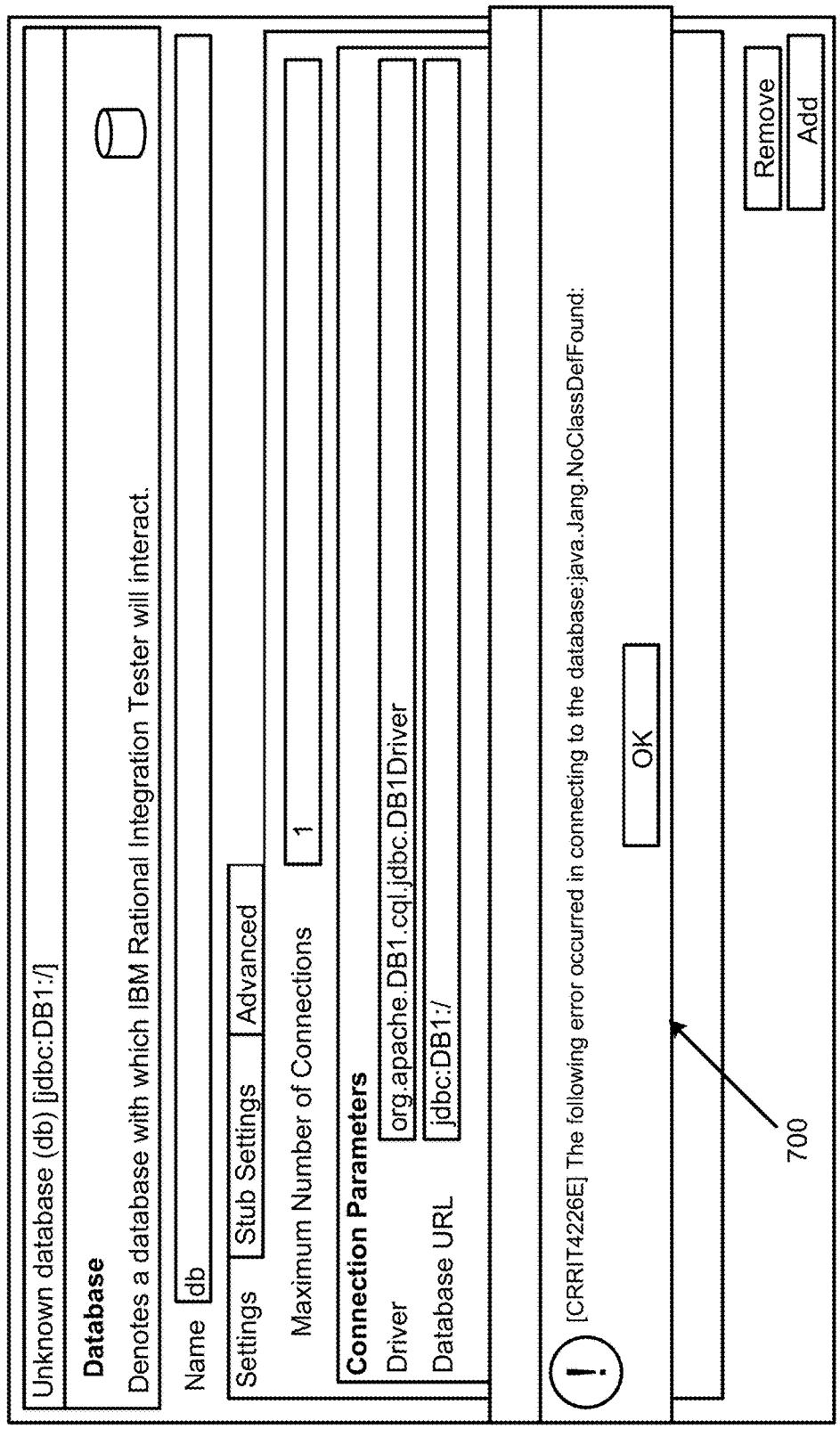
FIG. 7 illustrates a user interface display of an error message in the integration testing tool while testing the connection between the integration testing tool and the unstructured database, according to an example of the present disclosure.

The connection establisher 124 may test the connection in the integration testing tool 110 while adding the Jar files in the library 112 using the unstructured database connection setup available. FIG. 7 illustrates a user interface display of an error message in the integration testing tool 110 while testing the connection between the integration testing tool 110 and the unstructured database 106, according to an example of the present disclosure. Referring to FIG. 7, any error with respect to testing of the connection may be displayed as an error message that identifies the error as a database connection message as shown at 700. The error message may include an error identification (ID). For the example of FIG. 7, the error ID may be "CCR1T4226E". Once an error is identified, the connection establisher 124 may communicate with the integration testing tool 110, where the GUI of the integration testing tool 110 is used to display the error message.

Figure 8:
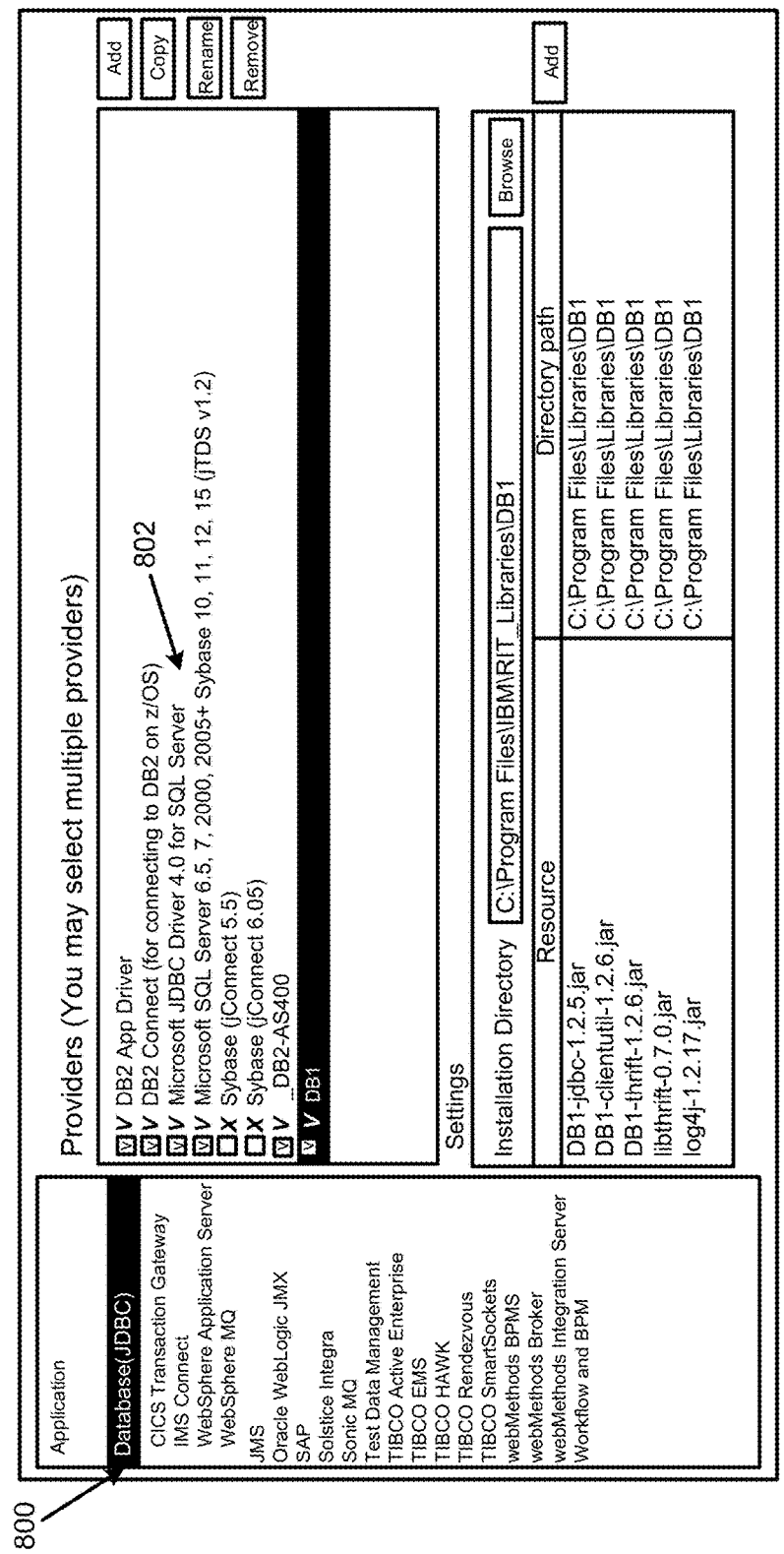
FIG. 8 illustrates a user interface display of the library for the integration testing tool, according to an example of the present disclosure.

FIG. 8 illustrates a user interface display of the library 112 for the integration testing tool 110, according to an example of the present disclosure. Referring to FIG. 8, as all the dependency files 120 and the driver class file 108 are determined, the dependency files 120 and the driver class file 108 may be stored in the library 112 for the integration testing tool 110. For the example of a Cassandra database, as shown at 800, the unstructured database 106 may be identified. The corresponding dependency files 120 and the driver class file 108 may be stored shown at 802 to the library 112.

Figure 9:
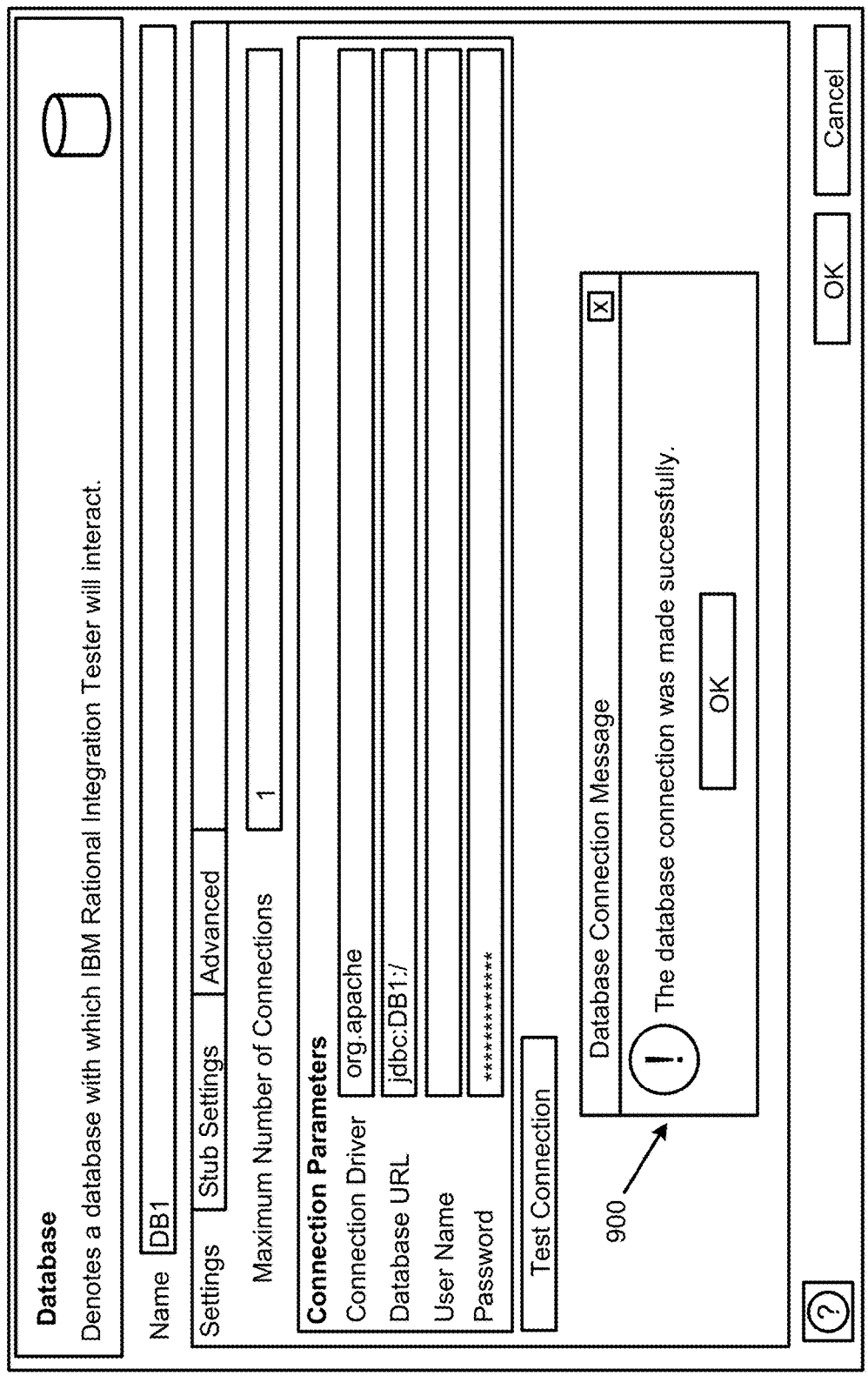
FIG. 9 illustrates a user interface display of a successful connection between the integration testing tool and the unstructured database, according to an example of the present disclosure.

FIG. 9 illustrates a user interface display of a successful connection between the integration testing tool 110 and the unstructured database 106, according to an example of the present disclosure. Referring to FIG. 9, a successful connection message between the integration testing tool 110 and the unstructured database 106 may be displayed as shown at 900. In this regard, the connection establisher 124 may communicate with the integration testing tool 110, where the GUI of the integration testing tool 110 is used to display the successful connection message.

Referring again to FIG. 1B, with the connection between the integration testing tool 110 and the unstructured database 106 being established, the integration testing tool 110 may operate as a client to the unstructured database 106. Based on a query (e.g., insert, update, select, etc.,) in a test case of the integration testing tool 110 using a query command action, retrieval of the data 122 from the unstructured database 106 and update of the data 122 in the unstructured database 106 may be performed.

The function result validator 126 may validate a result of a function performed by the application 128. The function result validator 126 may be implemented as a component of the ITA 100 as illustrated in FIG. 1B, or separately from the ITA 100 and the integration testing tool 110. The application server 130 may host and execute the application 128. The function result validator 126 may validate the result of the function performed by the application 128. The function result validator 126 may compare validation data generated by the application server 130 executing the application 128 with the data 122 from the unstructured database 106. The validation data may include server logs from the application server 130, where the server logs are associated with performance of a function by the application 128. In response to a determination that the validation data from the application server 130 matches the data 122 from the unstructured database 106, the function result validator 126 may determine that the result of the function performed by the application 128 is valid. Further, in response to a determination that the validation data from the application server 130 does not match the data 122 from the unstructured database 106, the function result validator 126 may determine that the result of the function performed by application 128 is invalid.

With respect to matching of the validation data from the application server 130 to the data 122 from the unstructured database 106, according to an example, a logging operation performed on the function performed by the application 128 as stored on the application server 130 may be compared to corresponding values stored in the unstructured database 106.

Figure 10:
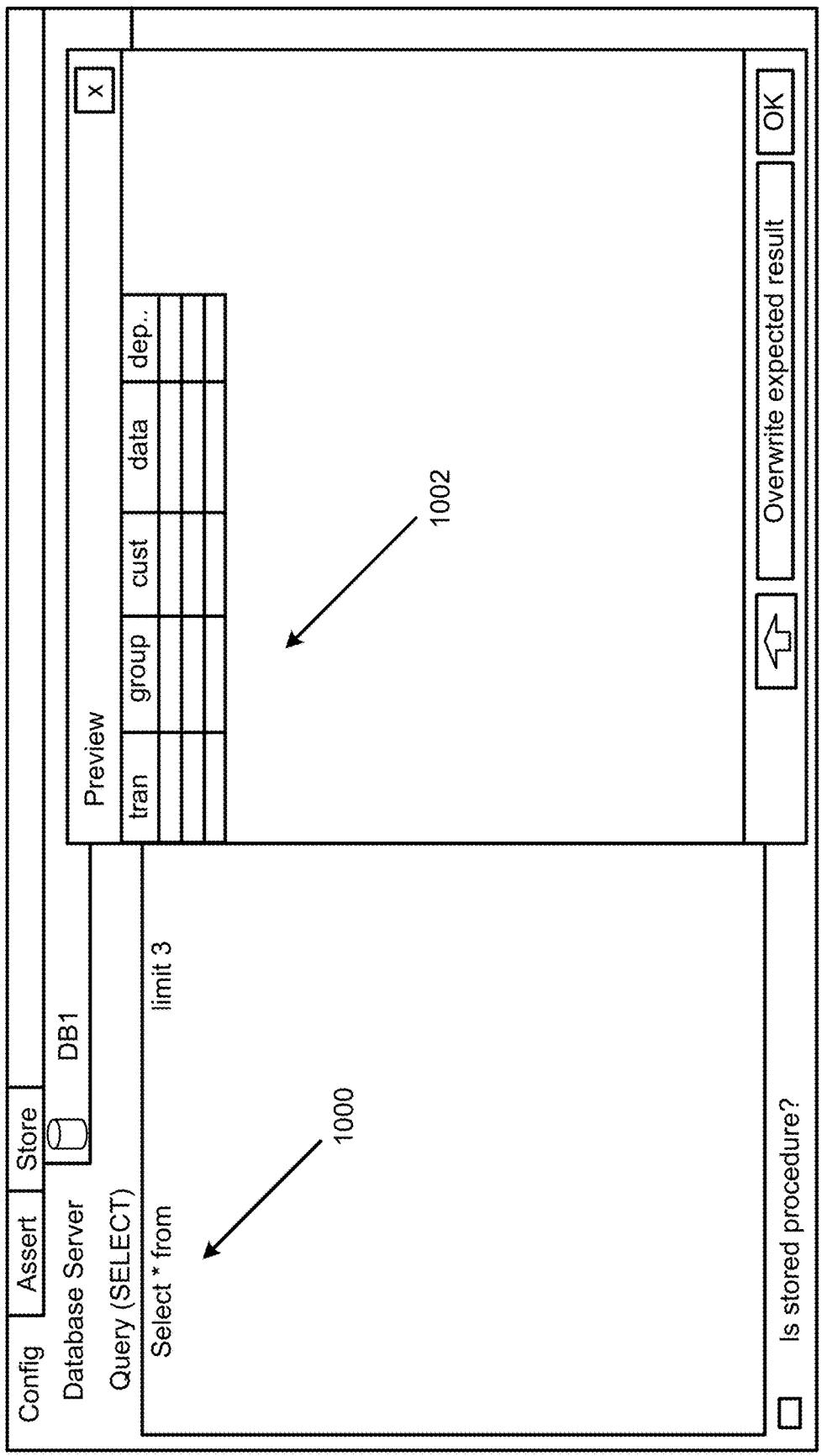
FIG. 10 illustrates a user interface display of a result from the integration testing tool based on a select query, according to an example of the present disclosure.

The integration testing tool 110 may include a feature to tag the values retrieved from the unstructured database 106. The tagging of values may make it possible for automated testing of different services of the application 128 with the unstructured database 106. That is, the tagging of values may make it possible for different types of values to be compared to validation data as disclosed herein. For example, FIG. 10 illustrates a user interface display of a result from the integration testing tool 110 based on a select query 1000, according to an example of the present disclosure. For the example of DB1, FIG. 10 illustrates the query (e.g., select query 1000), and a preview of the output at 1002 in the form of a table. For the example of FIG. 10, one or more of the values in the columns for transaction, group, customer, etc., may be tagged. The tagging may prevent the tagged value from being modified based on further performance of a function by the application 128. Moreover, further performance of a function by the application 128 may be used to determine how tagging of a particular value (or values) affects other non-tagged values.

Referring again to FIG. 1B, the device controller 132 may control operation of the device 134 in response to determining that the result of the function performed by the application 128 is valid. Examples of operations of the device 134 may include dispensing cash at an automatic teller machine (ATM), generating a fraud alert with respect to a bank transaction, etc. The device 134 may include any type of device that includes a processor capable of executing machine-readable instructions to perform one or more operations.

Figure 11:
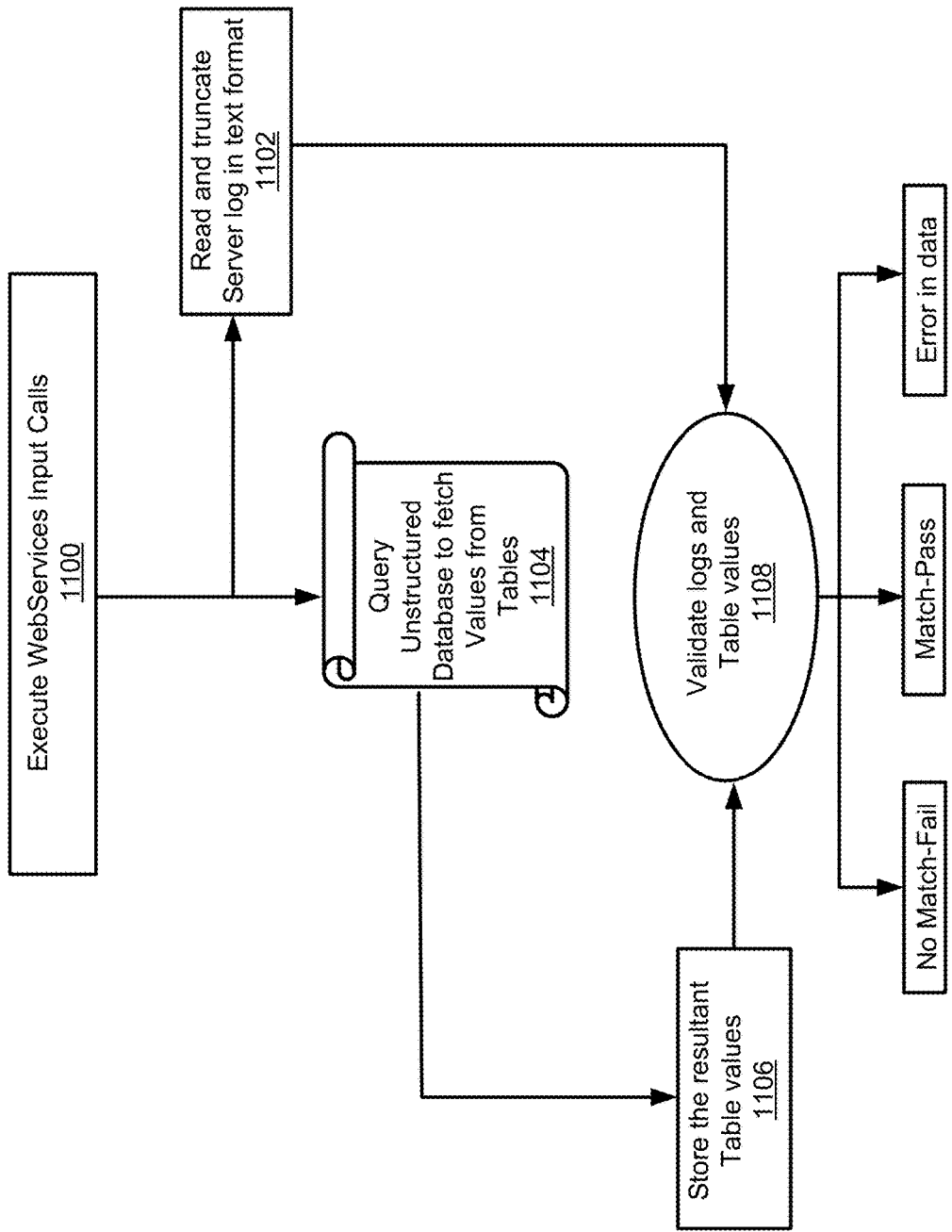
FIG. 11 illustrates a flowchart of an operation of the ITA of FIG. 1B, according to an example of the present disclosure.

FIG. 11 illustrates a flowchart of an operation of the ITA 100, according to an example of the present disclosure.

Referring to FIG. 11, integration testing of the application 128 is illustrated. The application 128 may perform a function that generates web services calls. The web services calls may provide, for example, for management of e-mail addresses, passwords, etc., associated with user credentials. At block 1100, the application 128 may perform a function that generates web services calls, which are executed. In this regard, a script may be generated to truncate server logs of the application server 130 associated with the application 128. The performance of the function by the application may update certain fields in the unstructured database 106.

At block 1102, a log may be captured for the web services call. In this regard, the server log for the application server 130 may be read and truncated in a text format. Further, the server log for the application server 130 may be stored in a text format.

At block 1104, as part of the integration testing of the application 128, the unstructured database 106 may be queried to fetch values from the tables thereof. For example, the function result validator 126 may query the unstructured database 106 to fetch values from the tables thereof.

At block 1106, results of the query may be stored. If needed, certain results may be tagged as disclosed herein with respect to FIG. 10.

At block 1108, the function result validator 126 may validate the result of the function performed by the application 128 by comparing validation data from the application server 130 with the data 122 from the unstructured database 106. An example of the validation data may include a field value from the application server 130. If the values at block 1106 include tagged values, then the function result validator 126 may validate the result of the function performed by the application 128 by comparing the validation data from block 1102 with the associated tagged values from block 1106. The results of the validation may include a "no match—Fail", a "match—Pass", or an indication of error in the data. The "no match—Fail" may correspond to an "invalid" result of the query as disclosed herein, and the "match—Pass" may correspond to an "valid" result of the query as disclosed herein.

Examples of application of the ITA 100 may include anomaly detection (e.g., fraud detection, or any type of event detection). According to an example related to anomaly detection, the application 128 may include the data 122 that is stored in the unstructured database 106 (e.g., where the unstructured database 106 operates as a back-end database). According to an example, the data 122 may be stored using clusters (e.g., Cassandra clusters for a Cassandra database).

In order to validate results of a function performed by the application 128, the ITA 100 may be used to validate results of the function performed by the application 128. For example, the application 128 may include a banking application. An example of a function performed by the application 128 may include withdrawal of a predetermined amount of funds from an account. Once the function is executed by the application 128, the function result validator 126 may use an automation script to verify log values from the application server 130 with the data 122 of unstructured database 106. In this regard, the function result validator 126 may verify that the log values from the application server 130 are accurate. The function result validator 126 may execute a query, which is associated with the function performed by the application 128, to the unstructured database 106 to validate validation data related to the application 128. The validation data may represent columns or data field names. In this regard, the ITA 100 may provide for the execution of a function by the application 128, and validation (e.g., by the function result validator 126) of the validation data of the application 128 with the associated data 122 stored in the unstructured database 106.

For the example of fraud detection, examples of fields that may be checked include account, channel, timestamp, source ID, target ID, etc. For the example of fraud detection, examples of functions performed by the application 128 may include account balance checks, cash withdrawal, deposits, etc.

For the example of validation of the validation data of the application 128 with the associated data 122 stored in the unstructured database 106 disclosed herein, the function result validator 126 may generate an alert if the validation data of the application 128 does not match the associated data 122 stored in the unstructured database 106. Alternatively, if the validation data of the application 128 matches the associated data 122 stored in the unstructured database 106, the function result validator 126 may trigger the device controller 132 to control operation of the device 134. For an example of an ATM, the device 134 may include a cash dispenser, where the device controller 132 may control operation of the ATM to dispense cash.

According to another example of application of the ITA 100, a bank may create account information on its system of records. When the accounts are created, the details of the accounts may need to be verified. If the system of records is an unstructured database that can be accessed by web services, the integration testing tool 110 may be used to create the account, and then validate whether the account has been created according to the transaction creating it by querying the unstructured database and verifying the records on it.

According to another example of application of the ITA 100, application 128, designated a System-A application, may call a System-B application. The System-A application and the System-B application may record passing payloads as validation data in the application server 130. The passing payloads may include, for example, transaction results associated with a function performed by the System-A application, which also calls the System-B application to perform the function. The passing payloads may be compared to the data 122 from the unstructured database 106 to determine whether the passing payloads are correctly generated by the System-A application and the System-B application. For example, a transaction result associated with the System-A application and the System-B application may be compared to a transaction result stored in the unstructured database 106 to determine whether the transaction results are identical, or whether one of the applications has incorrectly modified the transaction results.

According to another example of application of the ITA 100, data associated with a transaction may need to be replicated across multiple databases. In this regard, data associated with a transaction may be recorded as validation data in the application server 130. The data associated with the transaction may be compared to the data 122 from the unstructured database 106 to determine whether the data associated with the transaction and the data 122 from the unstructured database 106 are identical, and thus correctly replicated.

Figure 12:
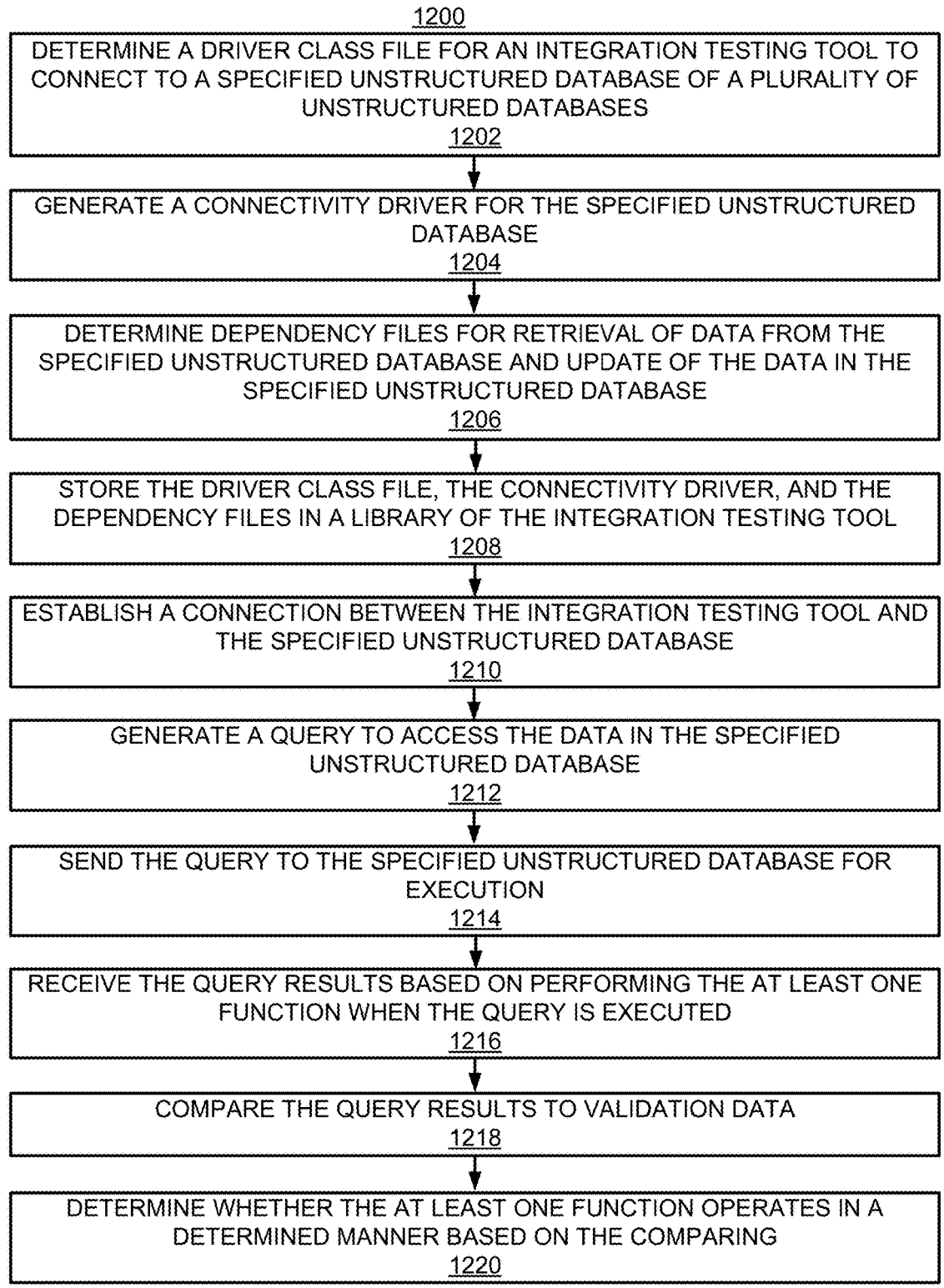
FIG. 12 illustrates a flowchart of a method for performing integration testing using an unstructured database, according to an example of the present disclosure.

FIG. 12 illustrates a flowchart of a method 1200 for performing integration testing using an unstructured database, according to an example. The method 1200 may be implemented on the ITA 100 described above with reference to FIGS. 1B-11 by way of example and not limitation.

At block 1202, the method 1200 may include determining the driver class file 108 for the integration testing tool 110 to connect to the specified unstructured database 106 of a plurality of unstructured databases. The driver class file 108 may include parameters of the specified unstructured database 106. The parameters may be validated to connect the integration testing tool 110 to the specified unstructured database 106. The driver class file 108 may be determined from the plurality of files 104 associated with the plurality of unstructured databases. The integration testing tool 110 may test at least one function performed by the application 128. The application 128 may store the data 122 in the specified unstructured database 106 responsive to performing the at least one function.

At block 1204, the method 1200 may include generating a connectivity driver 116 for the specified unstructured database 106. The connectivity driver 116 may include a path to a location of the driver class file 108. The path may be used to access the driver class file 108.

At block 1206, the method 1200 may include determining dependency files 120 for the specified unstructured database 106. The dependency files 120 may be used to retrieve the data 122 from the specified unstructured database 106. The dependency files 120 may be used to update the data 122 in the specified unstructured database 106. The dependency files 120 may be determined from the plurality of files 104 associated with the plurality of unstructured databases.

At block 1208, the method 1200 may include storing the driver class file 108, the connectivity driver 116, and the dependency files 120 in the library 112 of the integration testing tool 110. The library 112 of the integration testing tool 110 may store executable files for integration testing of the application 128.

At block 1210, the method 1200 may include establishing a connection between the integration testing tool 110 and the specified unstructured database 106. The connection is established using the driver class file 108 and the connectivity driver 116.

At block 1212, the method 1200 may include generating a query to access the data 122 in the specified unstructured database 106. The query may be in a format compatible with the specified unstructured database 106. The data 122 may represent a result based on performing the at least one function.

At block 1214, the method 1200 may include sending the query to the specified unstructured database 106 for execution. The dependency files 120 may be used, based on the query, to retrieve query results from the specified unstructured database 106.

At block 1216, the method 1200 may include receiving the query results based on performing the at least one function when the query is executed.

At block 1218, the method 1200 may include comparing the query results to validation data.

At block 1220, the method 1200 may include determining whether the at least one function operates in a determined manner based on the comparing.

According to examples, the method 1200 may further include validating the query results based on comparing the query results to the validation data 122 to determine whether the at least one function operates in the determined manner. Further, the method 1200 may include controlling operation of the device 134 based on validating the query results of the at least one function performed by the application 128.

According to examples, the method 1200 may further include generating the connectivity driver 116 for the specified unstructured database 106 by determining the path to the location of a folder of the driver class file 108, and using the path to the location of the folder of the driver class file 108 to generate the connectivity driver 116 for the specified unstructured database 106.

According to examples, the method 1200 may further include testing the connection between the integration testing tool 110 and the specified unstructured database 106 prior to establishing the connection between the integration testing tool 110 and the specified unstructured database 106. In response to determining that the connection between the integration testing tool 110 and the specified unstructured database 106 is unsuccessful, and the driver class file 108 is determined, the method 1200 may include searching for an error related to dependencies, and determining, based on the error related to dependencies, a dependency file to store in the library 112. The dependency file may be determined from the plurality of files 104 associated with the plurality of unstructured databases, and the dependency file may be added to the dependency files 120. The method 1200 may include storing the dependency files 120 in the library 112, and re-testing the connection between the integration testing tool 110 and the specified unstructured database 106.

According to examples, the method 1200 may further include testing the connection between the integration testing tool 110 and the specified unstructured database 106 prior to establishing the connection between the integration testing tool 110 and the specified unstructured database 106. In response to determining that the connection between the integration testing tool 110 and the specified unstructured database 106 is unsuccessful, and the driver class file 108 is incorrectly determined, the method 1200 may include searching for an error message. The method 1200 may further include determining, based on the error message, a different driver class file 108 to store in the library 112. The different driver class file 108 may be determined from the plurality of files 104 associated with the plurality of unstructured databases. The method 1200 may further include storing the different driver class file 108 in the library 112, and re-testing the connection between the integration testing tool 110 and the specified unstructured database 106. The connection between the integration testing tool 110 and the specified unstructured database 106 may be re-tested based on the different driver class file 108 stored in the library 112.

According to examples, the method 1200 may further include testing the connection between the integration testing tool 110 and the specified unstructured database 106 prior to establishing the connection between the integration testing tool 110 and the specified unstructured database 106. In response to determining that the connection between the integration testing tool 110 and the specified unstructured database 106 is unsuccessful and the driver class file 108 is correctly determined, or the connection between the integration testing tool 110 and the specified unstructured database 106 is unsuccessful and the driver class file 108 is incorrectly determined, the method 1200 may include determining a dependency file or a different driver class file 108, respectively, to store in the library 112. The dependency file or the different driver class file 108, respectively, may be determined from the plurality of files 104 associated with the plurality of unstructured databases. The dependency file or the different driver class file 108, respectively, may be determined to address an error related to dependencies or an error related to validation of the parameters of the specified unstructured database 106. The method 1200 may further include storing the dependency file or the different driver class file 108, respectively, in the library 112, and re-testing the connection between the integration testing tool 110 and the specified unstructured database 106 to establish the connection between the integration testing tool 110 and the specified unstructured database 106, or to iteratively store another dependency file or another driver class file 108, respectively, in the library 112 until successful establishment of the connection between the integration testing tool 110 and the specified unstructured database 106.

According to examples, the method 1200 may further include validating the query results based on comparing the query results to the validation data 122 to determine whether the at least one function operates in the determined manner. In response to determining that the validation data 122 matches the query results, the method 1200 may include determining that the at least one function operates in the determined manner. Alternatively, in response to determining that the validation data 122 does not match the query results, the method 1200 may include determining that the at least one function does not operate in the determined manner.

According to examples, the method 1200 may further include generating an alert in response to determining that the at least one function does not operate in the determined manner.

Figure 13:
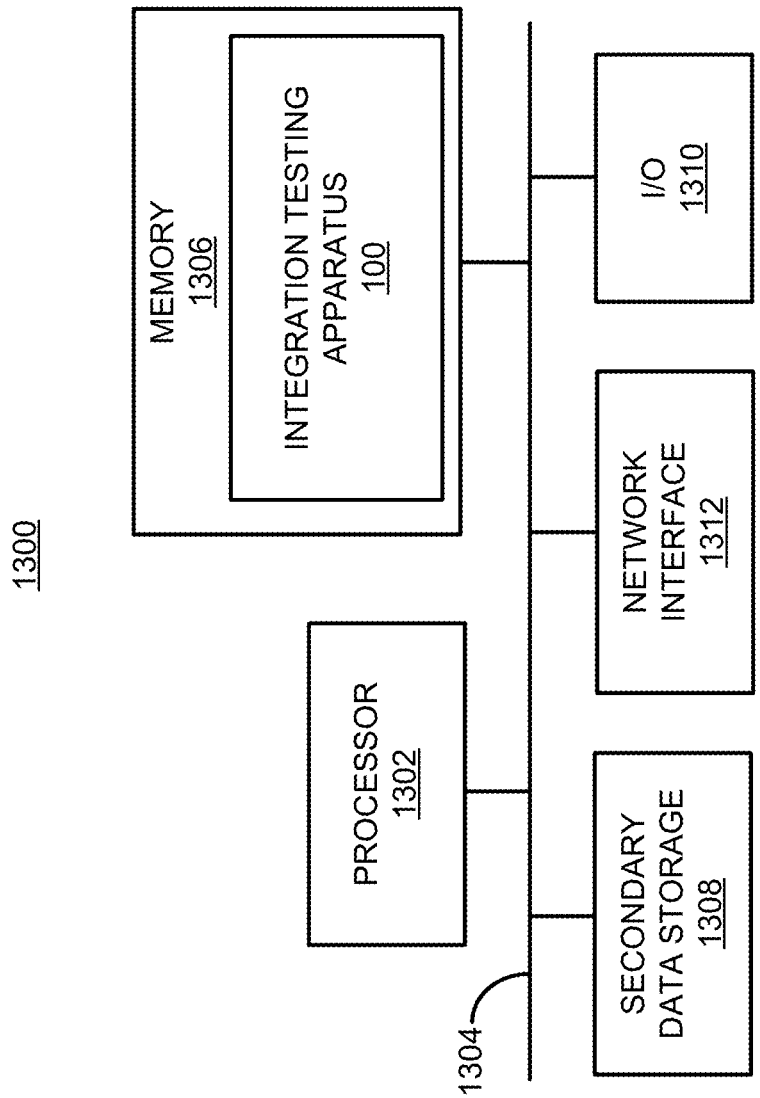
FIG. 13 illustrates a computer system, according to an example of the present disclosure.

FIG. 13 shows a computer system 1300 that may be used with the examples described herein. The computer system may represent a computational platform that includes components that may be in a server or another computer system. The computer system 1300 may be used as part of a platform for the ITA 100. The computer system 1300 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1300 may include a processor 1302 that may implement or execute machine readable instructions performing some or all of the methods, functions and other processes described herein. Commands and data from the processor 1302 may be communicated over a communication bus 1304. The computer system may also include a main memory 1306, such as a random access memory (RAM), where the machine readable instructions and data for the processor 1302 may reside during runtime, and a secondary data storage 1308, which may be non-volatile and stores machine readable instructions and data. The memory and data storage are examples of computer readable mediums. The memory 1306 may include the ITA 100 including machine readable instructions residing in the memory 1306 during runtime and executed by the processor 1302.

The computer system 1300 may include an I/O device 1310, such as a keyboard, a mouse, a display, etc. The computer system may include a network interface 1312 for connecting to a network. Other known electronic components may be added or substituted in the computer system.

The processor 1302 may be designated as a hardware processor. The processor 1302 may execute various components of the ITA 100. For example, the processor 1302 may execute the driver class file identifier 102, the connectivity driver generator 114, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An integration testing apparatus comprising:
a memory to store instructions; and
a processor, connected to the memory, to execute the instructions to:
determine a driver class file for an integration testing tool to connect to a specified unstructured database of a plurality of unstructured databases, where
the driver class file includes parameters of the specified unstructured database,
the parameters are validated to connect the integration testing tool to the specified unstructured database,
the driver class file is determined from a plurality of files associated with the plurality of unstructured databases,
the integration testing tool is to test at least one function performed by an application, and
the application is to store data in the specified unstructured database responsive to performing the at least one function;
generate a connectivity driver for the specified unstructured database, where
the connectivity driver includes a path identifier that identifies a location of the driver class file, and
the path identifier is used to access the driver class file;
establish a connection between the integration testing tool and the specified unstructured database, where
the connection is established using the driver class file and the connectivity driver;
generate a query to access the data in the specified unstructured database, where
the query is in a format compatible with the specified unstructured database, and
the data represents a result based on performing the at least one function;
send the query to the specified unstructured database for execution;
receive query results from the specified unstructured database, where
the query results are received based on performing the at least one function when the query is executed;
compare the query results to validation data; and
determine whether the at least one function operates in a determined manner based on the comparing.

2. The integration testing apparatus according to claim 1, where the processor further executes the instructions to:
validate the query results based on comparing the query results to the validation data; and
control operation of a device based on validating the query results of the at least one function performed by the application.

3. The integration testing apparatus according to claim 1, where the processor further executes the instructions to:
generate the connectivity driver for the specified unstructured database by determining the path to the location of a folder of the driver class file; and using the path to the location of the folder of the driver class file to generate the connectivity driver for the specified unstructured database.

4. The integration testing apparatus according to claim 1, where the processor further executes the instructions to:

test the connection between the integration testing tool and the specified unstructured database prior to establishing the connection between the integration testing tool and the specified unstructured database;

in response to determining that the connection between the integration testing tool and the specified unstructured database is unsuccessful, and the driver class file is determined, search for an error related to dependencies, and determine, based on the error related to dependencies, a dependency file from the plurality of files associated with the plurality of unstructured databases, where the dependency file is added to dependency files for the specified unstructured database; and re-test the connection between the integration testing tool and the specified unstructured database.

5. The integration testing apparatus according to claim 1, where the processor further executes the instructions to:

test the connection between the integration testing tool and the specified unstructured database prior to establishing the connection between the integration testing tool and the specified unstructured database;

in response to determining that the connection between the integration testing tool and the specified unstructured database is unsuccessful, and the driver class file is incorrectly determined, search for an error message, and determine, based on the error message, a different driver class file, where the different driver class file is determined from the plurality of files associated with the plurality of unstructured databases; and re-test the connection between the integration testing tool and the specified unstructured database, where the connection between the integration testing tool and the specified unstructured database is re-tested based on the different driver class file.

6. The integration testing apparatus according to claim 1, where the processor further executes the instructions to:

test the connection between the integration testing tool and the specified unstructured database prior to establishing the connection between the integration testing tool and the specified unstructured database;

in response to determining that the connection between the integration testing tool and the specified unstructured database is unsuccessful and the driver class file is correctly determined, or the connection between the integration testing tool and the specified unstructured database is unsuccessful and the driver class file is incorrectly determined, determine a dependency file or a different driver class file, where the dependency file or the different driver class file, respectively, is determined from the plurality of files associated with the plurality of unstructured databases, and the dependency file or the different driver class file, respectively, is determined to address an error related to dependencies or an error related to validation of the parameters of the specified unstructured database; and re-test the connection between the integration testing tool and the specified unstructured database to establish the connection between the integration testing tool and the specified unstructured database.

7. The integration testing apparatus according to claim 1, where the processor further executes the instructions to:

validate the query results based on comparing the query results to the validation data to determine whether the at least one function operates in the determined manner; and in response to determining:

that the validation data matches the query results:

determine that the at least one function operates in the determined manner; or that the validation data does not match the query results:

determine that the at least one function does not operate in the determined manner.

8. The integration testing apparatus according to claim 7, where the processor further executes the instructions to:

generate an alert in response to determining that the at least one function does not operate in the determined manner.

9. A method for performing integration testing using an unstructured database, the method comprising:

determining a driver class file for an integration testing tool to connect to a specified unstructured database of a plurality of unstructured databases, where the driver class file includes parameters of the specified unstructured database, the parameters are validated to connect the integration testing tool to the specified unstructured database, the driver class file is determined from a plurality of files associated with the plurality of unstructured databases, the integration testing tool is to test at least one function performed by an application, the application is to store data in the specified unstructured database responsive to performing the at least one function, and the determining is performed by a computer;

generating a connectivity driver for the specified unstructured database by:

determining a path to a location of a folder of the driver class file, and using the path to the location of the folder of the driver class file to generate the connectivity driver for the specified unstructured database, where the path is used to access the driver class file, and the generating is performed by the computer;

establishing a connection between the integration testing tool and the specified unstructured database, where the connection is established using the driver class file and the connectivity driver, and the establishing is performed by the computer;

generating a query to access the data in the specified unstructured database, where the query is in a format compatible with the specified unstructured database, the data represents a result based on performing the at least one function, and the generating of the query is performed by the computer;

sending the query to the specified unstructured database for execution, where the sending is performed by the computer;
receiving query results from the specified unstructured database based on performing the at least one function when the query is executed, where
the receiving is performed by the computer;
comparing the query results to validation data, where the comparing is performed by the computer;
determining whether the at least one function operates in a determined manner based on the comparing, where the determining is performed by the computer; and
validating the query results based on comparing the query results to the validation data to determine whether the at least one function operates in the determined manner, where
the validating is performed by the computer.

10. The method of claim 9, further comprising:
controlling operation of a device based on validating the query results of the at least one function performed by the application, where
the controlling is performed by the computer.

11. The method of claim 9, further comprising:
testing the connection between the integration testing tool and the specified unstructured database prior to establishing the connection between the integration testing tool and the specified unstructured database, where the testing is performed by the computer;
in response to determining that the connection between the integration testing tool and the specified unstructured database is unsuccessful, and the driver class file is determined,
searching for an error related to dependencies, where the searching for the error is performed by the computer, and
determining, based on the error related to dependencies, a dependency file from the plurality of files associated with the plurality of unstructured databases, where
the dependency file is added to dependency files for the specified unstructured database, and
the determining of the dependency file is performed by the computer; and
re-testing the connection between the integration testing tool and the specified unstructured database, where the re-testing is performed by the computer.

12. The method of claim 9, further comprising:
testing the connection between the integration testing tool and the specified unstructured database prior to establishing the connection between the integration testing tool and the specified unstructured database, where the testing is performed by the computer;
in response to determining that the connection between the integration testing tool and the specified unstructured database is unsuccessful, and the driver class file is incorrectly determined,
searching for an error message, where
the searching for the error message is performed by the computer, and
determining, based on the error message, a different driver class file, where
the different driver class file is determined from the plurality of files associated with the plurality of unstructured databases, and
the determining of the different driver class file is performed by the computer; and
re-testing the connection between the integration testing tool and the specified unstructured database, where
the connection between the integration testing tool and the specified unstructured database is re-tested based on the different driver class file, and
the re-testing is performed by the computer.

13. The method of claim 9, further comprising:
testing the connection between the integration testing tool and the specified unstructured database prior to establishing the connection between the integration testing tool and the specified unstructured database, where the testing is performed by the computer;
in response to determining that the connection between the integration testing tool and the specified unstructured database is unsuccessful and the driver class file is correctly determined, or the connection between the integration testing tool and the specified unstructured database is unsuccessful and the driver class file is incorrectly determined,
determining a dependency file or a different driver class file, where
the dependency file or the different driver class file, respectively, is determined from the plurality of files associated with the plurality of unstructured databases,
the dependency file or the different driver class file, respectively, is determined to address an error related to dependencies or an error related to validation of the parameters of the specified unstructured database, and
the determining of the dependency file or the different driver class file is performed by the computer; and
re-testing the connection between the integration testing tool and the specified unstructured database to establish the connection between the integration testing tool and the specified unstructured database, where
the re-testing is performed by the computer.

14. The method of claim 10, where validating the query results and controlling operation of the device further comprises:
in response to determining that the validation data matches the query results,
determining that the at least one function operates in the determined manner, and
controlling operation of the device to perform a predetermined operation associated with the at least one function, where
the determining that the at least one function operates in the determined manner and the controlling operation of the device to perform the predetermined operation are performed by the computer; or
in response to determining that the validation data does not match the query results,
determining that the at least one function does not operate in the determined manner, and
generating an alert, where
the determining that the at least one function does not operate in the determined manner and the generating of the alert are performed by the computer.

15. A non-transitory computer-readable medium storing instructions, the instructions comprising:
one or more instructions which, when executed by one or more processors, cause the one or more processors to:
determine a driver class file for an integration testing tool to connect to a specified unstructured database of a plurality of unstructured databases, where the driver class file includes parameters of the specified unstructured database,
the parameters are validated to connect the integration testing tool to the specified unstructured database, and
the driver class file is determined from a plurality of files associated with the plurality of unstructured databases,
the integration testing tool is to test at least one function performed by an application, and
the application is to store data in the specified unstructured database responsive to performing the at least one function;
generate a connectivity driver for the specified unstructured database, where
the connectivity driver includes a path identifier that identifies a location of the driver class file, and
the path identifier is used to access the driver class file;
establish a connection between the integration testing tool and the specified unstructured database, where
the connection is established using the driver class file and the connectivity driver;
generate a query to access the data in the specified unstructured database, where
the query is in a format compatible with the specified unstructured database, and
the data represents a result based on performing the at least one function;
send the query to the specified unstructured database for execution;
receive query results from the specified unstructured database based on performing the at least one function when the query is executed;
compare the query results to validation data;
determine whether the at least one function operates in a determined manner based on the comparing;
validate the query results based on comparing the query results to the validation data to determine whether the at least one function operates in the determined manner; and
control operation of a device based on validating the query results of the at least one function performed by the application.

16. The non-transitory computer-readable medium of claim 15, where the instructions to validate the query results further include:
in response to determining:
that the validation data matches the query results:
determine that the at least one function operates in the determined manner; or
that the validation data does not match the query results:
determine that the at least one function does not operate in the determined manner.

17. The non-transitory computer-readable medium of claim 16, where the instructions to control the operation of the device further include:
control operation of the device to perform a predetermined operation associated with the at least one function based on determining that the at least one function operates in the determined manner; and
generate an alert based on determining that the at least one function does not operate in the determined manner.

18. The non-transitory computer-readable medium of claim 15, further comprising instructions to:
test the connection between the integration testing tool and the specified unstructured database prior to establishing the connection between the integration testing tool and the specified unstructured database;
in response to determining that the connection between the integration testing tool and the specified unstructured database is unsuccessful, and the driver class file is determined,
search for an error related to dependencies, and
determine, based on the error related to dependencies, a dependency file from the plurality of files associated with the plurality of unstructured databases, where
the dependency file is added to dependency files for the specified unstructured database; and
re-test the connection between the integration testing tool and the specified unstructured database.

19. The non-transitory computer-readable medium of claim 15, further comprising instructions to:
test the connection between the integration testing tool and the specified unstructured database prior to establishing the connection between the integration testing tool and the specified unstructured database;
in response to determining that the connection between the integration testing tool and the specified unstructured database is unsuccessful, and the driver class file is incorrectly determined,
search for an error message, and
determine, based on the error message, a different driver class file, where
the different driver class file is determined from the plurality of files associated with the plurality of unstructured databases; and
re-test the connection between the integration testing tool and the specified unstructured database, where
the connection between the integration testing tool and the specified unstructured database is re-tested based on the different driver class file.

20. The non-transitory computer-readable medium of claim 15, further comprising instructions to:
test the connection between the integration testing tool and the specified unstructured database prior to establishing the connection between the integration testing tool and the specified unstructured database;
in response to determining that the connection between the integration testing tool and the specified unstructured database is unsuccessful and the driver class file is correctly determined, or the connection between the integration testing tool and the specified unstructured database is unsuccessful and the driver class file is incorrectly determined,
determine a dependency file or a different driver class file, where
the dependency file or the different driver class file, respectively, is determined from the plurality of files associated with the plurality of unstructured databases, and
the dependency file or the different driver class file, respectively, is determined to address an error related to dependencies or an error related to validation of the parameters of the specified unstructured database; and
re-test the connection between the integration testing tool and the specified unstructured database to establish the connection between the integration testing tool and the specified unstructured database.

* * * * *